United States Patent [19]

Callenberg

[11] 4,026,513
[45] May 31, 1977

[54] PILOT VALVE

[75] Inventor: Russell J. Callenberg, Benicia, Calif.

[73] Assignee: Grove Valve and Regulator Company, Oakland, Calif.

[22] Filed: Nov. 6, 1975

[21] Appl. No.: 629,213

[52] U.S. Cl. .............................. 251/61.1; 137/489; 137/513.3

[51] Int. Cl.² ....................................... G05D 16/16

[58] Field of Search .............. 137/489, 489.5, 485, 137/488, 513.3; 251/337, 61.1

[56] References Cited

UNITED STATES PATENTS

| | | | |
|---|---|---|---|
| 2,930,398 | 3/1960 | Barrett et al. | 137/489 |
| 2,938,537 | 5/1960 | Silver et al. | 137/489 |
| 3,136,329 | 6/1964 | Issbrucker | 137/489 X |
| 3,276,467 | 10/1966 | Case | 137/489 |
| 3,592,223 | 7/1971 | Reese | 137/513.3 X |
| 3,669,142 | 6/1972 | Cerbic | 137/489 |
| 3,792,713 | 2/1974 | Zadoo | 137/489.5 X |

*Primary Examiner*—Alan Cohan
*Attorney, Agent, or Firm*—Melvin R. Stidham

[57] ABSTRACT

A pressure control valve wherein the monitored pressure acts against a diaphragm in opposition to a fixed biasing force which urges a poppet valve away from the seat. A disc with a small orifice therein covers a sensing port whereby flow of the monitored pressure into and out of the diaphragm chamber is retarded to minimize chatter of the diaphragm. A spring holding the orifice disc in place may be overcome by the monitored pressure to allow inward flow around the disc in the event that the orifice is occluded, whereby the valve will not enable undesirable pressure build up in the system in response to a false low pressure signal.

3 Claims, 2 Drawing Figures

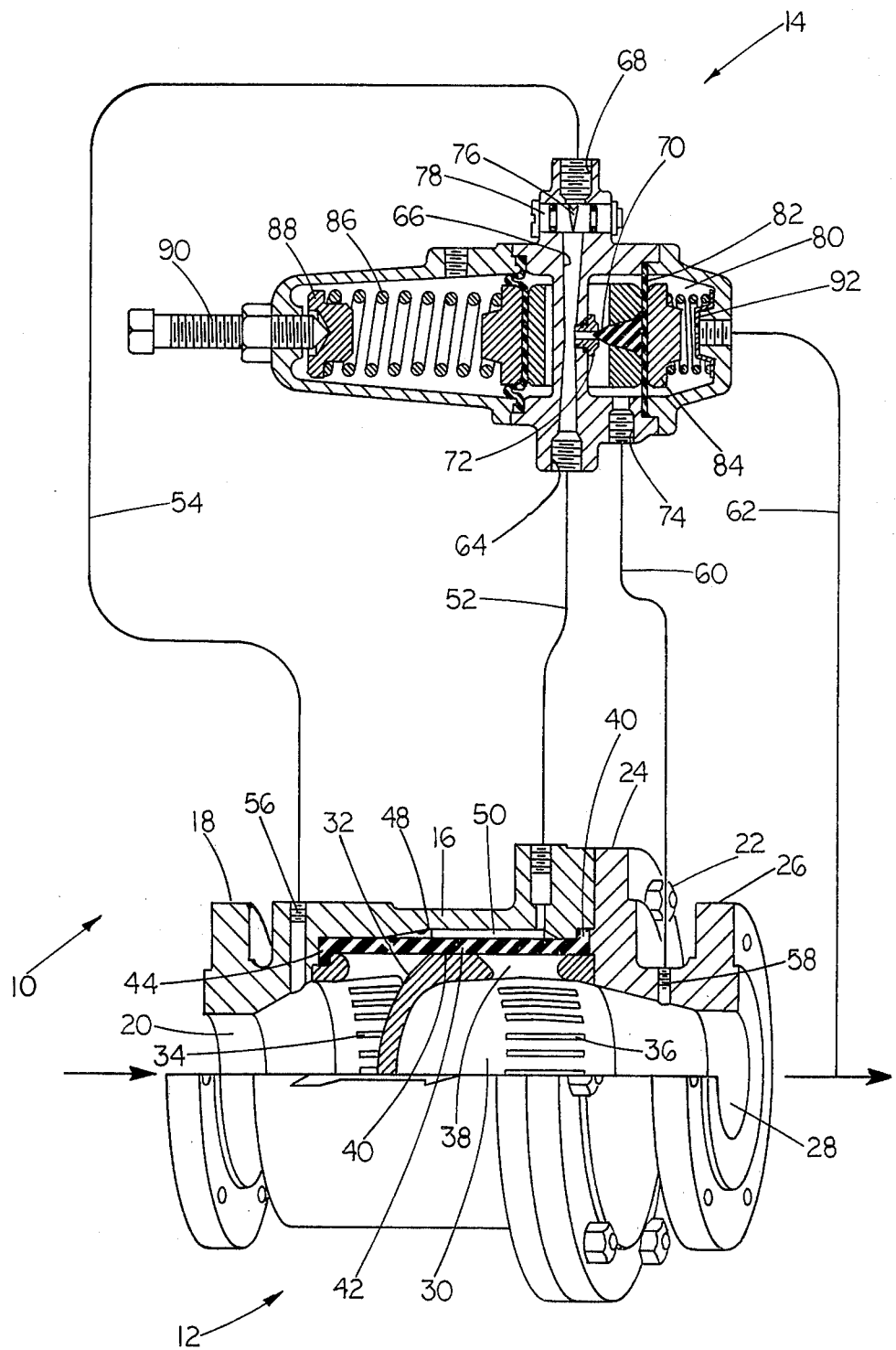
FIG.-1-

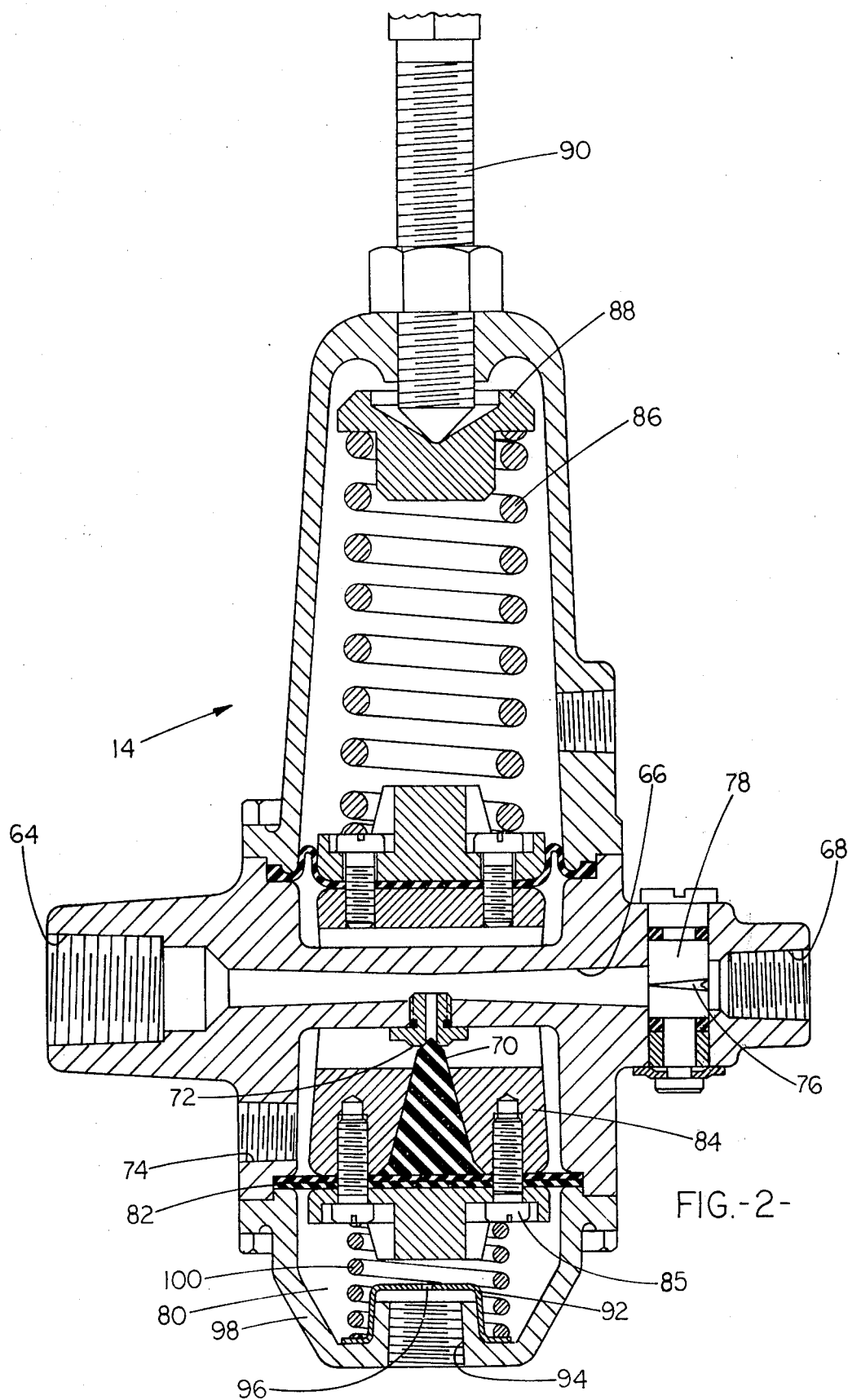
FIG.-2-

PILOT VALVE

BACKGROUND OF THE INVENTION

In known pressure control valves the monitored pressure acts against a piston or diaphragm in opposition to a fixed force, such as a spring or jacket pressure. A poppet valve carried by the diaphragm may be opened when the monitored pressure is overcome by the fixed force to initiate a pressure build up in the system in controlling downstream pressure, or it may be opened by overcoming the fixed force to receive a monitored upstream pressure. In either event, there is often a lag between the level of the pressure being controlled and that in the sensing chamber whereby there is often a considerable amount of cycling or chatter as the valves seek to maintain the desired level. Others have sought to cure such chatter by the provision of mechanical means such as dash pots, friction restrainers and the like, or by the provision of an orifice in the sensing port whereby the operation of the valve itself is dampened. However, if the orifice is too restrictive it could become clogged or occluded by a particle of matter entrained in the gas stream and, should such occlusion operate to prevent entry of the sensing fluid, the valve could be held in open position (or held closed in the case of upstream monitoring) causing an undesirable and, perhaps, dangerous pressure build up in the system.

OBJECTS OF THE INVENTION

It is an object of this invention to provide a pressure control valve having means to prevent chatter.

It is a further object of this invention to provide a pressure control valve with diaphragm damping means and means to insure free flow of monitored fluid into the sensing chamber.

Other objects and advantages of this invention will become apparent from the description to follow when read in conjunction with the accompanying drawings.

BRIEF SUMMARY OF THE INVENTION

In carrying out this invention, there is provided a pressure control valve, such as a pilot valve wherein a poppet valve is carried by a diaphragm to seal against a seat. The diaphragm is biased in one direction by a fixed force, such as a spring and the pressure being monitored is directed to a sensing chamber wherein it is exposed to the other side of the diaphragm. Commonly, the pressure being monitored is that on the downstream side, in which case it will overcome the spring and close the valve when it builds up to the desired level. A disc or cap with a small orifice opening therethrough is held across the port opening into the sensing chamber by means of a small spring biased between it and the underside of the diaphragm. The small spring biases the diaphragm to insure valve closing at zero pressure and, in addition, causes the orifice disc to function as a safety valve to be carried away from the sensing port in the event of excessive resistance to flow through the orifice, as in the event of the orifice becoming plugged or occluded. This prevents a false low sensing pressure caused by orifice blockage which would otherwise hold the valve open in downstream control or hold it closed in upstream control. In either event, a dangerous pressure build-up could result.

BRIEF DESCRIPTION OF THE DRAWINGS

In the drawings:

FIG. 1 is a more or less schematic view, partially in section, showing a pressure regulation system employing a pressure control valve embodying the present invention; and FIG. 2 is a vertical section view of the pressure control valve.

DESCRIPTION OF A PREFERRED EMBODIMENT

Referring now to FIG. 1 with greater particularity, there is shown a pressure regulating system 10 including an expansible tube type pressure regulator 12 and a pressure control or pilot valve 14. The pressure regulator valve 12 has a generally cylindrical housing 16, including an upstream hub 18 provided with a central flow passage 20. Secured onto the downstream end of the housing 16, as by means of bolts 22, is a closure member 24 carrying the downstream hub 26 and having an outlet flow passage 28 therethrough. A core sleeve 30 is positioned within the housing 16 and includes a dam or barrier 32 that extends completely across the inside thereof to prevent axial flow of fluid through it. However, flow around the dam 32 is enabled through spaced series of inlet and outlet slots 34 and 36 between ribs 38. The ribs 38 and an outer cylindrical sealing surface 40 of the barrier 32 are normally snuggly embraced by an expansible tube or sleeve 42, which is stretched around them. The expansible tube 42 has an in-turned flange 44 at the upstream end that is clamped and sealed between the core sleeve 30 and the body 16 and an out-turned flange 46 at the downstream end that is clamped between the body 16 and the downstream closure member 24.

The inner surface of the regulator body 16 is tapered outward at 48 to form a control chamber or jacket 50 to which a control pressure fluid may be delivered from the pilot valve 14 through a duct 52.

In the regulator system 10 illustrated, the jacket or control pressure is tapped through an upstream pilot load line 54 connected to a fitting 56 opening into the upstream flow passage 20. A similar fitting 58 is provided in a downstream flow passage 28 whereby the control pressure fluid may be evacuated from the jacket 50, back through the pilot valve 14 and out through a dumping duct 60, which opens into a low pressure zone in a downstream flow passage 28 of the regulator valve 12. The pressure being monitored and controlled is conveniently tapped from a suitable location in a downstream pipeline (not shown) through a duct 62 to the pressure control or pilot valve 14 of this invention.

Considering now FIG. 2 along with FIG. 1, the jacket load-unload duct 52 is connected to one end port 64 of a through conduit 66 which extends completely across the pilot valve 14, and the upstream tap duct 54 is connected at the other end port 68. Because of the through conduit 66, the jacket 50 of the expansible tube pressure regulator 12 is in continuous communication with the upstream flow passage 20, whereby the upstream pressure acting on the interior of the expansible tube 42 is balanced by the jacket pressure surrounding it. With the interior and exterior pressures so balanced, the valve is retained in closed condition by stretching the tube 42 around the cylindrical sealing surface 40. Evacuation of the control jacket 50 through the load-unload duct 52 to the dumping duct 60 is achieved when a valve closure member 70 of the poppet type is moved away from the valve port 72 which opens laterally from the through conduit 66 intermediate the opposite end ports 64 and 68, the fluid flowing from the pilot valve through a port fitting 74 to which the dumping duct 60 is connected.

A variable orifice 76, which is formed in a rotatable plug 78 extending across the through flow passageway 66, restricts flow into the through passageway from the upstream tap 54 while it and the jacket 50 are being evacuated through the ports 72 and 74.

Where, as shown, the downstream fluid pressure is being monitored, it is introduced from the sensing line 62 into a sensing chamber 80 in the pilot valve 14 to act against one side of a diaphragm 82 which is sealed across the chamber 80. The diaphragm is secured on a carrier member 84, as by means of cap screws 85 (FIG. 2), and the action of the monitored fluid in the sensing chamber 80 is opposed by a relatively strong spring 86 acting between the carrier 84 and a spring cap 88, which may be moved toward or away from the carrier 84 to adjust the spring compression by means of an adjustment screw 90.

As a particular feature of this invention, a cap or disc 92 is seated over the inside portion of the sensing port 94 and is provided with a small orifice 96 to restrict the flow of sensing fluid into and out of the sensing chamber 80, thereby dampening the fluctuation of the diaphragm 82.

The orifice cap 92 is urged against the bottom 98 of the pilot valve by means of a relatively light spring 100 which also acts against the bottom of the carrier 84 to insure closing of the valve 70 at zero sensing pressure. With the spring 100 so disposed, the cap or disc 92 acts in the nature of safety valve to be moved away from its seat 94, 98 in the event of increased resistance to flow through the orifice 96, as in the event that it becomes plugged or occluded by particles that may be in the gas stream. This will insure that, even in the event of clogging, gas will be free to flow into the port 94 to overcome the spring 86 and close the valve 70 even though flow through the orifice may be blocked or impeded. Otherwise, the result could be an undesirable, and perhaps even dangerous, pressure build-up with the valve being held open against a sensing pressure which is lower than the monitored pressure in the system simply because the monitored pressure does not have free access to the sensing chamber 80. Similarly, if the pilot valve 14 is modified for upstream pressure control wherein the spring 86 biases a valve plug toward closed position, a clogged orifice could hold the valve closed with a false low pressure in the sensing chamber 80, again to cause dangerous pressure build-up.

Besides providing a safety valve operation, the light spring 100 biasing the back disc 92 to its seat and the sensing pressure opposing it may agitate the disc 92 sufficiently to cause the clogging material to be dislodged from the orifice 96.

While this invention has been described in conjunction with a preferred embodiment thereof, it is obvious that modifications and changes therein may be made by those skilled in the art without departing from the spirit and scope of this invention as defined by the claims appended hereto.

What is claimed as invention is:

1. In a pressure control valve including:
    a housing;
    a pressure responsive member sealed across said housing to form a sensing chamber therein;
    said member being movable in response to forces asserted against it;
    a valve passageway in said housing;
    a valve port in said passageway;
    a complementary valve member carried by said pressure responsive member;
    fluid pressure in said chamber acting on one side of said pressure responsive member;
    means for applying a predetermined force against the other side of said pressure-responsive member;
    a sensing port opening into said chamber to introduce fluid being pressure-controlled;
    the improvement comprising;
    a disc in said chamber covering said sensing port;
    a small orifice in said disc to restrict flow into and out of said chamber; and
    spring means biasing between said disc and said one side of the pressure responsive member urging said disc against said sensing port;
    said spring being selected so as to be overcome by the fluid being pressure-controlled to enable entry thereof into said chamber in the event of blockage of said orifice.

2. The pressure control valve defined by claim 1 including:
    an annular lip in said housing around said sensing port;
    said disc being cupped to seat over and around said lip.

3. The pressure control valve defined by claim 1 wherein:
    said pressure responsive member is a diaphragm.

* * * * *